(12) United States Patent
Oakley (10) Patent No.: US 12,105,529 B2
(45) Date of Patent: Oct. 1, 2024

(54) METHOD AND SYSTEM FOR AUTONOMOUS AND RANDOM DRONE TRAVEL

(71) Applicant: HOWARD UNIVERSITY, Washington, DC (US)

(72) Inventor: Imani R. Oakley, Mt. Clair, NJ (US)

(73) Assignee: Howard University, Washington, DC (US)

( * ) Notice: Subject to any disclaimer, the term of this patent is extended or adjusted under 35 U.S.C. 154(b) by 385 days.

(21) Appl. No.: 17/530,926

(22) Filed: Nov. 19, 2021

(65) Prior Publication Data

US 2022/0206513 A1    Jun. 30, 2022

Related U.S. Application Data

(63) Continuation-in-part of application No. 16/091,754, filed as application No. PCT/US2017/026402 on Apr. 6, 2017, now abandoned.

(60) Provisional application No. 62/319,110, filed on Apr. 6, 2016.

(51) Int. Cl.
| | | |
|---|---|---|
| *G05D 1/00* | (2024.01) | |
| *B64C 39/02* | (2023.01) | |
| *B64U 30/10* | (2023.01) | |
| *B64U 30/20* | (2023.01) | |
| *B64U 50/19* | (2023.01) | |

(52) U.S. Cl.
CPC ........... *G05D 1/101* (2013.01); *B64C 39/024* (2013.01); *B64U 30/10* (2023.01); *B64U 30/20* (2023.01); *B64U 50/19* (2023.01); *B64U 2201/104* (2023.01)

(58) Field of Classification Search
CPC ...... G05D 1/101; B64C 39/024; B64U 30/10; B64U 30/20; B64U 50/19; B64U 2201/104
See application file for complete search history.

(56) References Cited

U.S. PATENT DOCUMENTS

| | | |
|---|---|---|
| 2002/0030142 A1 | 3/2002 | James |
| 2005/0090972 A1 | 4/2005 | Bodin et al. |
| 2010/0042269 A1 | 2/2010 | Kokkeby et al. |
| 2010/0100269 A1 | 4/2010 | Ekhaguere et al. |
| 2010/0161159 A1 | 6/2010 | Dey et al. |
| 2010/0211243 A1 | 8/2010 | Yang et al. |
| 2011/0029234 A1 | 2/2011 | Desai et al. |
| 2012/0199698 A1 | 8/2012 | Thomasson et al. |

(Continued)

OTHER PUBLICATIONS

The Micro-Air-Vehicle Golden Snitch and Its Figure-of-8 Flapping (Year: 2009).*

(Continued)

*Primary Examiner* — Adam M Alharbi
(74) *Attorney, Agent, or Firm* — Sughrue Mion, PLLC (57) ABSTRACT

An aerial device is provided. The aerial device includes a processor and a memory that includes instructions configured to cause the processor to perform certain operations when the processor executes the instructions. The operations may include receiving a first signal indicative of a first position of the aerial device. The operations may also include generating, based on the first signal and based on a randomly or pseudo-randomly generated sequence, a second signal configured to actuate flight hardware of the aerial device to a second position.

17 Claims, 11 Drawing Sheets

(56) References Cited

U.S. PATENT DOCUMENTS

| | | |
|---|---|---|
| 2013/0240673 A1 | 9/2013 | Schlosser et al. |
| 2015/0120094 A1 | 4/2015 | Kimchi et al. |
| 2015/0344136 A1 | 12/2015 | Dahlstrom |
| 2016/0347462 A1* | 12/2016 | Clark ................ B64D 17/62 |
| 2017/0244937 A1* | 8/2017 | Meier ................ B64D 47/08 |
| 2019/0227826 A1 | 7/2019 | Taylor et al. |
| 2019/0243387 A1 | 8/2019 | Oakley et al. |
| 2020/0218288 A1 | 7/2020 | Johnson et al. |
| 2021/0261265 A1 | 8/2021 | Parvizian et al. |
| 2022/0206513 A1 | 6/2022 | Oakley |

OTHER PUBLICATIONS

International Search Report dated Feb. 28, 2023 issued by the International Searching Authority in Application No. PCT/US 22/50421.
Written Opinion dated Feb. 28, 2023 issued by the International Searching Authority in Application No. PCT/US 22/50421.
Written Opinion of the International Searching Authority and International Search Report, International Application No. PCT/US2017/026402, dated Jun. 20, 2017, 9 pages.

* cited by examiner

METHOD AND SYSTEM FOR AUTONOMOUS AND RANDOM DRONE TRAVEL

CROSS-REFERENCE TO RELATED APPLICATIONS

The present disclosure claims the benefit of U.S. patent application Ser. No. 16/091,754, which in turn claims the benefit of U.S. Provisional Patent Application No. 62/319,110 (filed Apr. 6, 2016), the disclosures of which are incorporated herein in their entirety by reference.

TECHNICAL FIELD

The present disclosure relates to drones. More particularly, the present disclosure relates to methods and systems for providing autonomous travel and random or pseudo-random travel paths for drones.

BACKGROUND

Drone technology is becoming increasingly prevalent in a wide variety of applications. For example, it has been suggested that, in the very near future, flying drones will serve as carriers for parcel delivery. Moreover, drones are now routinely used in military applications, and their use in urban areas for policing is also expected to become standard. Marine research may also benefit from submersible drones equipped with a plethora of sensors capable of probing specific underwater biological processes and provide telemetry in real time. Further, recreational drones are by far the most widely used, as they are inexpensive relative to their aforementioned counterparts.

Nevertheless, despite their widespread use and potential benefits, typical drones are "passive" machines that require at least some degree of user input for travel. For example, most recreational drones are typically remote-controlled. In the case of autonomous drones, i.e., drones that may travel without user intervention, a predetermined travel path is typically programmed into the drone, or the drone may be equipped to sense specific cues from its environment to help guide it towards a predetermined destination.

BRIEF SUMMARY

The embodiments described herein provide an autonomous drone that can fly randomly or in paths that appear random within a given region, without user input. Such a drone can thus be employed in a wide variety of recreational or surveillance applications. In the case of surveillance applications, the novel drone may be used as a patrol drone that is configured to move about a predefined region without user intervention, and in a randomly-appearing path.

One exemplary embodiment of the novel drone is an aerial device that includes a processor and a memory including instructions configured to cause the processor to perform certain operations when the processor executes the instructions. The operations may include receiving a first signal indicative of a first position of the aerial device. The operations may also include generating, based on the first signal and based on a randomly or pseudo-randomly generated sequence, a second signal configured to actuate flight hardware of the aerial device to a second position.

In another exemplary embodiment, the operations may include determining a current position of the aerial device while the aerial device is in flight and planning a random or pseudo-random flight path for the aerial device where the flight path originates from the current position. Further, in yet another exemplary embodiment, the operations may include receiving a first signal indicative of a position of the aerial device and autonomously plan a random or pseudo-random flight path to a second another position. The operations may further include generating a second signal configured to cause the aerial device to move along the random flight path to the second position.

Additional features, modes of operations, advantages, and other aspects of various embodiments are described below with reference to the accompanying drawings. It is noted that the present disclosure is not limited to the specific embodiments described herein. These embodiments are presented for illustrative purposes. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility. For example, while the exemplary embodiments are described in the context of a flying drone, one of skill in the art will readily recognize that the teachings featured herein also extend generally to land-based and marine-based drones.

Figure 1:
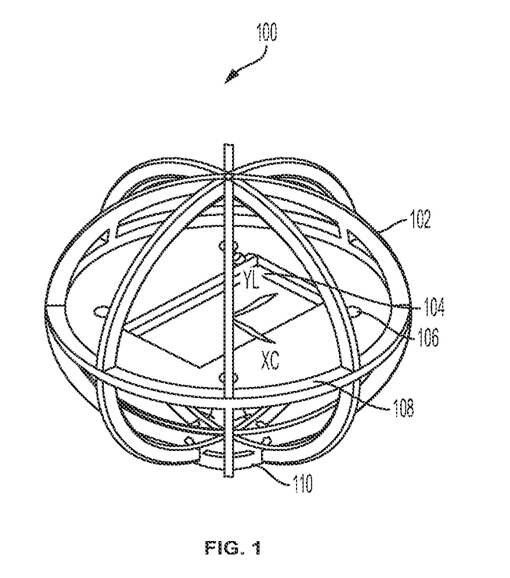
FIG. 1 illustrates a drone in accordance with one or more embodiments.
Figure 2:
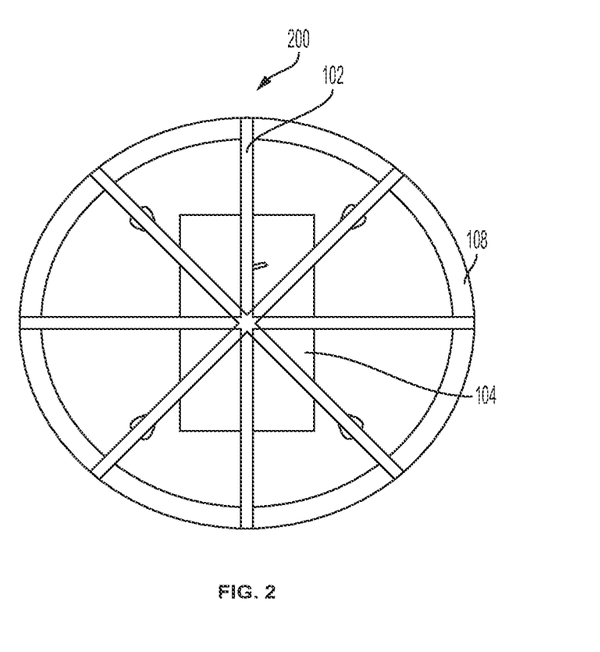
FIG. 2 illustrates another view of the drone of FIG. 1 in accordance with or more one embodiments.

FIG. 1 illustrates a drone 100 according to an embodiment, and FIG. 2 illustrates a top view 200 of the drone 100. As shall be described below in greater detail, the drone 100 is an aerial vehicle configured to perform autonomous flight and generate random or pseudo-random flight paths. The drone 100 includes a shell 102, forming a housing or a cage that serves to enclose several key components of the drone 100.

The housing can be made of plastic, or of other materials or combinations of materials. For example, the shell 102 can be made of a metal mesh. Furthermore, the shell 102 forms a spherical pattern as shown in FIG. 2, and has several openings. The propellers (not shown) can access the ambient air around the drone 100, causing the drone 100 to fly.

The drone 100 further includes a compartment 104 to house a control system for the drone 100. For example, the compartment 104 can include electrical systems, batteries, and microcontroller chips. These components cooperatively function to cause the drone 100 to fly autonomously along randomly or pseudo-randomly generated flight paths determined in real-time.

The drone 100 further includes a plurality of recesses 106 each serving to fit a motor and a propeller. The motor is controllable via one or more wires extending from the control system housed in the compartment 104. As shown in FIG. 1, the drone 100 features four recess 106, each capable of housing a single propeller. Therefore, as configured, the drone 100 is a quad-copter. Generally, other drones configurations, such as single-propeller drones, can also be used without departing from the scope of the present disclosure.

The drone 100 also includes a barrier 108 that fuses both halves of the sphere formed by the shell 102. For increased functionality, the compartment 104 can also have control system components placed in the bottom half of the sphere formed by the shell 102. Such additional components can include sensors, such as inertial sensors, GPS modules, additional batteries, antennas, and the like. The drone 100 further includes a substantially flat pole region which forms a support system 110 that provides a resting surface for the drone 100 when it has landed.

In some embodiments, the drone 100 can include additional structural features. For example, the drone 100 can include light emitting diodes (LEDs) mounted around the outer surface of the shell 102. In yet other embodiments, one or more wings like wing 300, shown in FIG. 3, can be mounted on an outer surface of the shell 102 (e.g., at an outer surface of the barrier 108). The set of wings may not necessarily participate in flight, but can be ornamental features of the drone 100.

Figure 3:
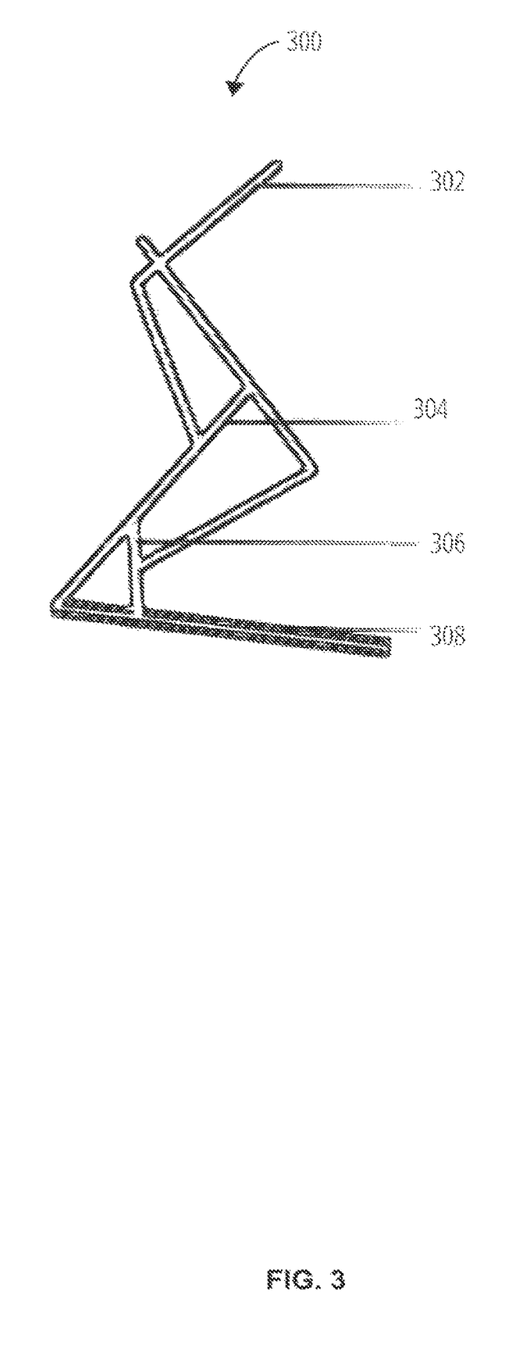
FIG. 3 illustrates a wing in accordance with one or more embodiments.
Figure 4:
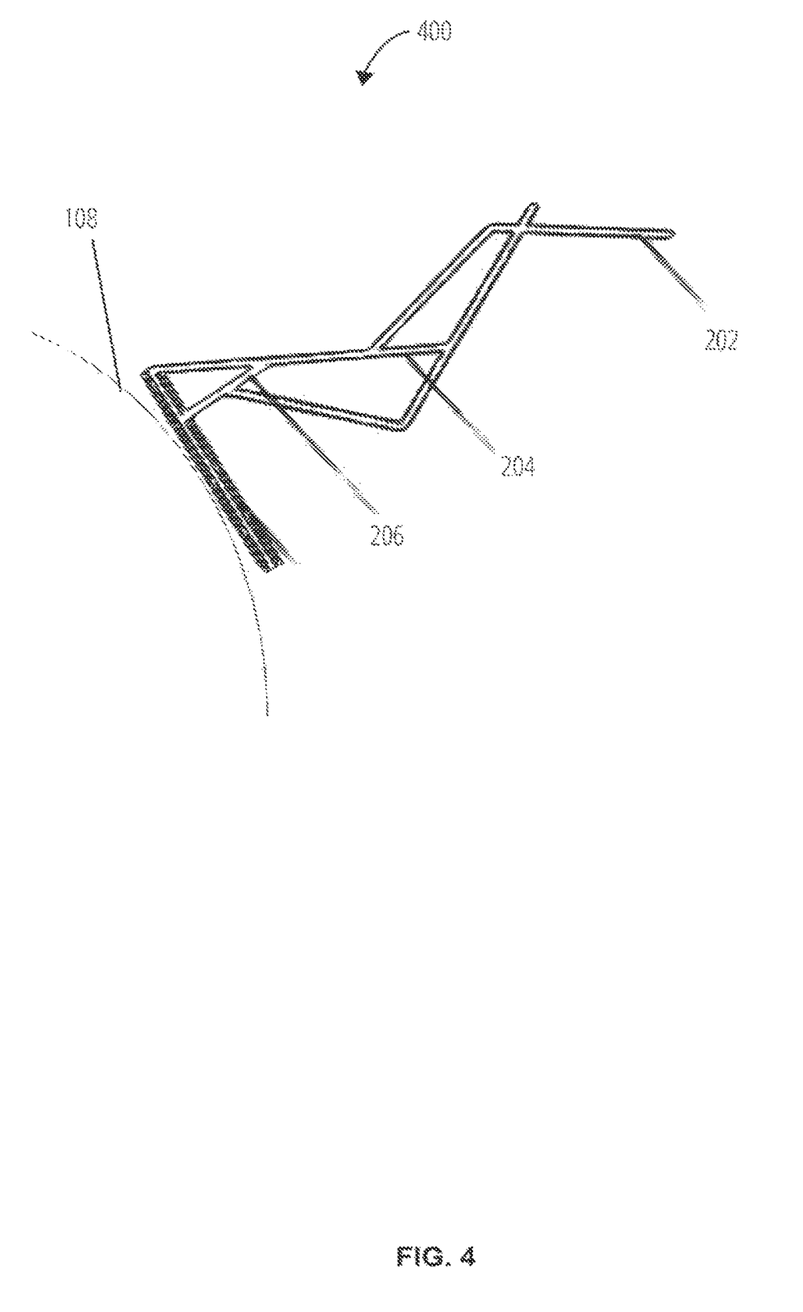
FIG. 4 illustrates another drone in accordance with one or more embodiments.

As depicted in FIG. 3, the wing 300 can be made of a material lighter than the shell 102. As such, the wing 300 may not actively interfere with the flight of the drone 100. In yet other embodiments, each wing 300 mounted on the drone 100 may be retractable. As shown in FIG. 3, the wing 300 includes a tip 302, a stationary axel 304, and a non-stationary axel 306 that can slide along a support rod 308, the latter being affixed onto the body of the drone 100, at the barrier 108, as depicted in the view 400 of FIG. 4.

Figure 5:
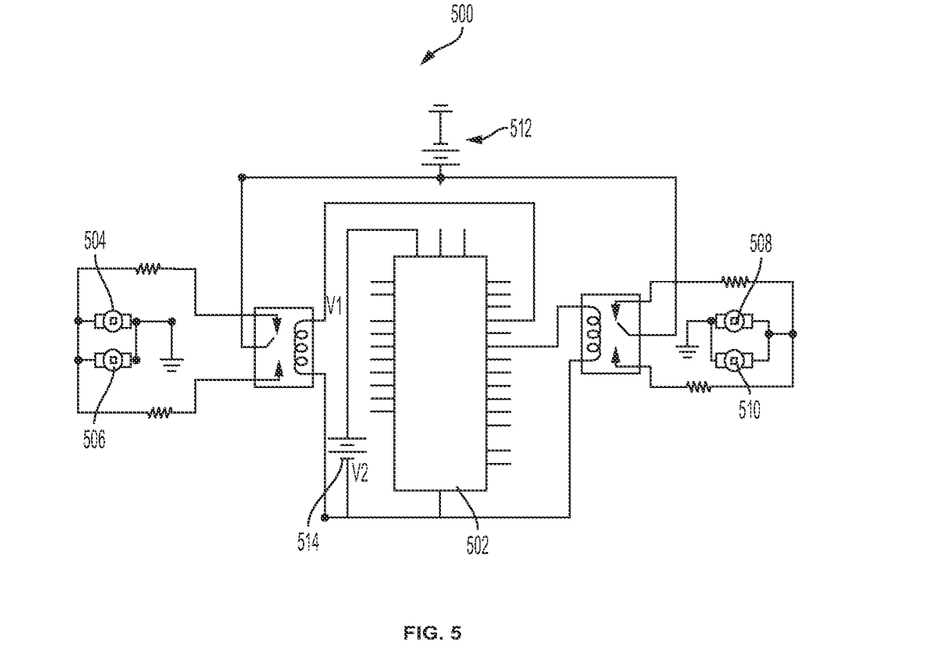
FIG. 5 depicts a block diagram of a drone controller in accordance with one or more embodiments.

FIG. 5 illustrates a block diagram of a control system 500 that can be used to control the drone 100 autonomously and that can generate random or pseudo-random flight paths. The control system includes a controller 502 housed in the compartment 104. The controller 502 can be an application-specific system, i.e., an embedded computer having a specific structure and software architecture that impart the drone 100 the functionalities described herein.

The specific structure is imparted to the controller 502 by instructions that are located in a memory of the controller 502. The controller 502 is electrically coupled to a set of motors, each being equipped with a propeller. In the case of the drone 100, the controller 502 controls four motors (504, 506, 508, and 510). Switching relays to the motors may be powered by a battery 512, and the controller 502 may be powered by a battery 514. The batteries 512 and 514 may be coupled to a battery charge regulator that may be coupled to the housing. The battery charge regulator and housing may be configured to couple to an insert that may, in turn, be configured to couple to an external battery charger.

Figure 6:
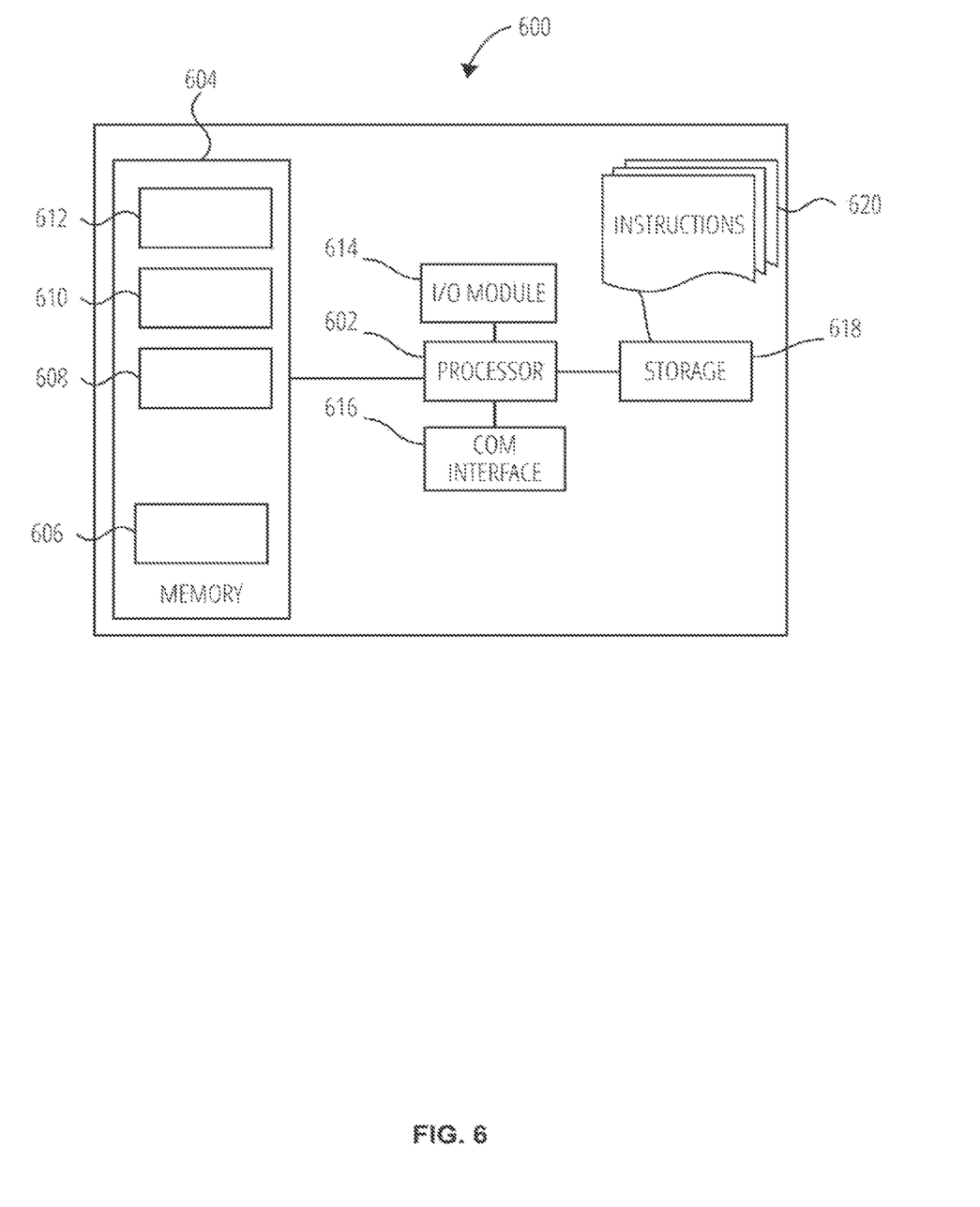
FIG. 6 illustrates another block diagram for a drone controller in accordance with one or more embodiments.

FIG. 6 illustrates a block diagram 600 of the controller 502, i.e., of its specific architecture imparted by a specific set of instructions. The instructions cause the controller 502 to actuate the flight hardware of the drone 100 to provide autonomous travel and random or pseudo-random flight paths. The flight hardware may include, among other things, motors, propellers, and one or more flight control surfaces (e.g., rudders, elevators, ailerons, flaps, slats, spoilers, tabs, and the like). The flight control surfaces may be actuated by one or more servomotors controlled by the controller 502. The actuation of the flight control surfaces may assist with stabilization of the aerial device that may allow for, among other things, the use of a single motor and a single propeller within the aerial device.

The controller 502 includes a processor 602 that has a specific structure. The specific structure is imparted to processor 602 by instructions stored in a memory 604 included therein and/or by instructions 620 that can be fetched by the processor 602 from a storage medium 618. The storage medium 618 may be co-located with the controller 502 or can be located elsewhere and be communicatively coupled to controller 502. The controller 502 can be a stand-alone programmable system, or can be a programmable module located in a much larger system. For example, the controller 502 can be part of a system-on-a-chip (SoC) architecture that also includes a transceiver module that allows uplinks and downlinks from and to remote devices.

The controller 502 may include one or more hardware and/or software components configured to fetch, decode, execute, store, analyze, distribute, evaluate, and/or categorize information. Furthermore, the controller 600 can include an input/output (I/O) 614 that configured to interface with a remote device, for example. The remote device may send a signal to the controller 502 to cause it to land when it is in flight, effectively allowing for a kill switch. In other words, the controller 502 may be configured to receive a signal that causes the drone 100 to lower its altitude and land, and turn off its propellers. Upon landing, the drone 100 may then turn on an LED, an RF burst signal, or a combination thereof in order to allow a user to locate the drone 100.

The processor 602 may include one or more processing devices or cores (not shown). In some embodiments, the processor 602 may be a plurality of processors, each having either one or more cores. The processor 602 can be configured to execute instructions fetched from memory 604, i.e. from one of the memory block 612, the memory block 610, the memory block 608, or the memory block 606, or the instructions may be fetched from the storage medium 618 or from a remote device connected to the controller 502 via a communication interface 616.

Furthermore, without loss of generality, storage medium 618 and/or memory 604 may include a volatile or nonvolatile, magnetic, semiconductor, tape, optical, removable, non-removable, read-only, random-access, or any type of non-transitory computer-readable computer medium. Storage medium 618 and/or memory 604 may include programs and/or other information that may be used by processor 602. Furthermore, storage medium 618 may be configured to log data processed, recorded, or collected during the operation of controller 600. The data may be time-stamped, location-stamped, cataloged, indexed, or organized in a variety of ways consistent with data storage practice.

In one embodiment, for example, the memory block 606 may include instructions that, when executed by the processor 602, cause processor 602 to perform certain operations. The operations can include receiving a first signal indicative of a first position of the drone 100 and generating, based on the first signal and based on a randomly or pseudo-randomly generated sequence, a second signal configured to actuate motion hardware (i.e., one or more of the motors 504, 506, 508, and 510) of the drone 100 to cause the drone 100 to move to a second position. The processor 602 may then continue in a loop and receive another first signal that is indicative of a current position of the drone 100 and subsequently generate another random or pseudo-random sequence to cause the drone 100 to move to yet another position.

The random or pseudo-random sequence may be, for example, a randomly or pseudo-randomly generated finite set of 3-dimensional coordinates, i.e., x, y, and z triplets. Taken together, the randomly or pseudo-randomly generated set of coordinates form a randomly or pseudo-randomly generated flight path. One of skill in the art will readily recognize that one or more random or pseudo-random numbers (i.e., the coordinates) may be generated using instructions that cause the processor 602 to sample a random or pseudo-random variable and yield the random or pseudo-random number. Generally, known methods for producing random or pseudo-random numbers in computer systems can be programmed into the controller 502 to provide the above-mentioned features.

Figure 7:
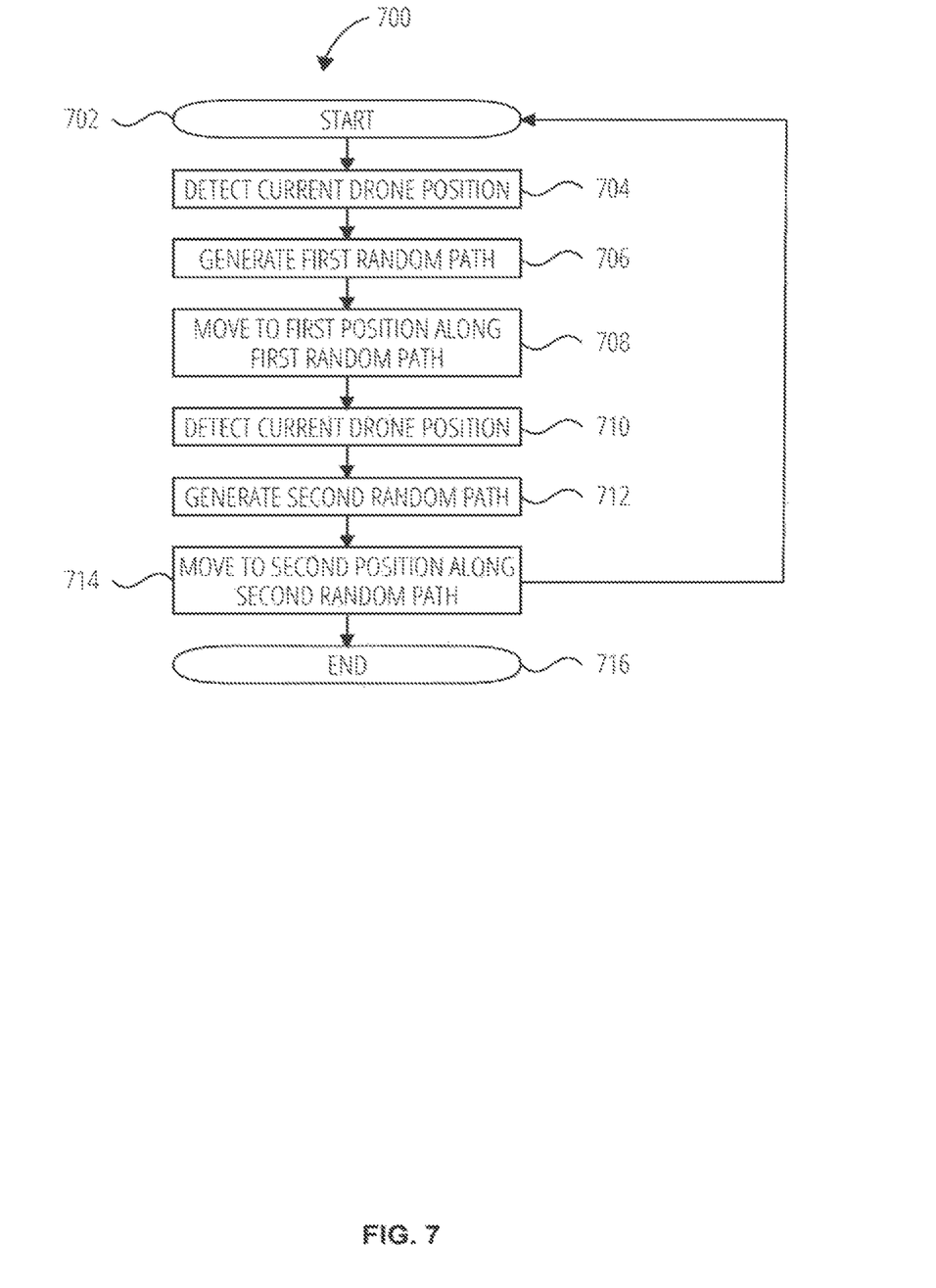
FIG. 7 illustrates a flow chart of a method in accordance with one or more embodiments.

A method 700 that is consistent with the embodiments' operation is described in reference to FIG. 7. The method 700 can begin at step 702, and it may include detecting at step 704, by a position sensor located on-board the drone 100, a current position of the drone 100. The position sensor may then transmit a signal indicative of the position of the drone 100 to the processor 602, which, based on the current position, generates (step 706) a random or pseudo-random path of travel for the drone 102.

The random or pseudo-random path of travel originates from the current position and ends at another position that is effectively random or pseudo-random relative to the current position of the drone 100. The drone 100 is then caused by the processor 602, by actuating its motion hardware, to move to the other position along the random or pseudo-random path of travel (step 708). The above-mentioned steps (704, 706, and 708) can be repeated in steps 710, 712, and 714 to move the drone 100 to yet another random or pseudo-random position. The method 700 can then end at step 716 or it may continue in a loop and start again at step 702.

Figure 8:
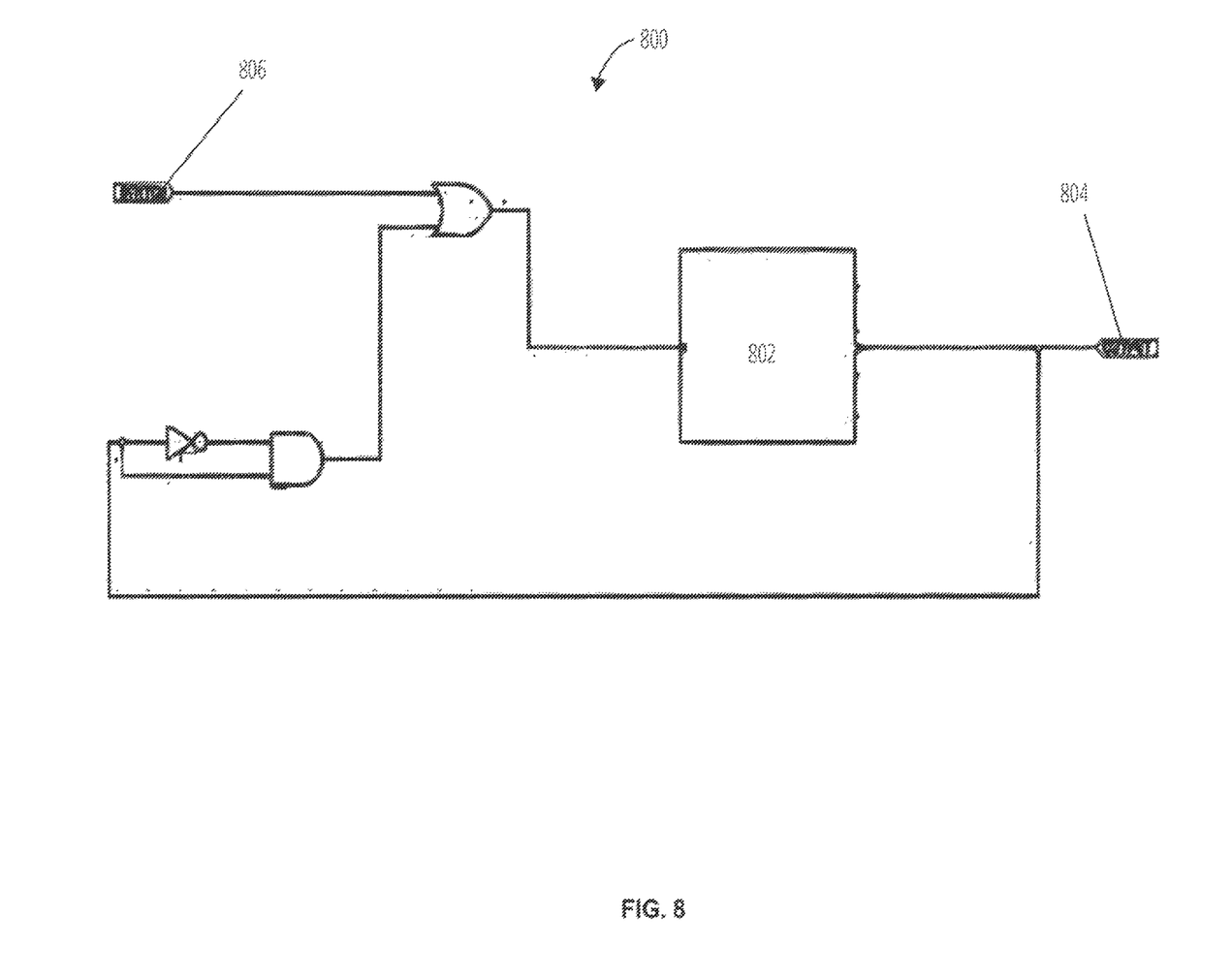
FIG. 8 illustrates a circuit implementation of a kill switch feature in accordance with one or more embodiments.
Figure 9:
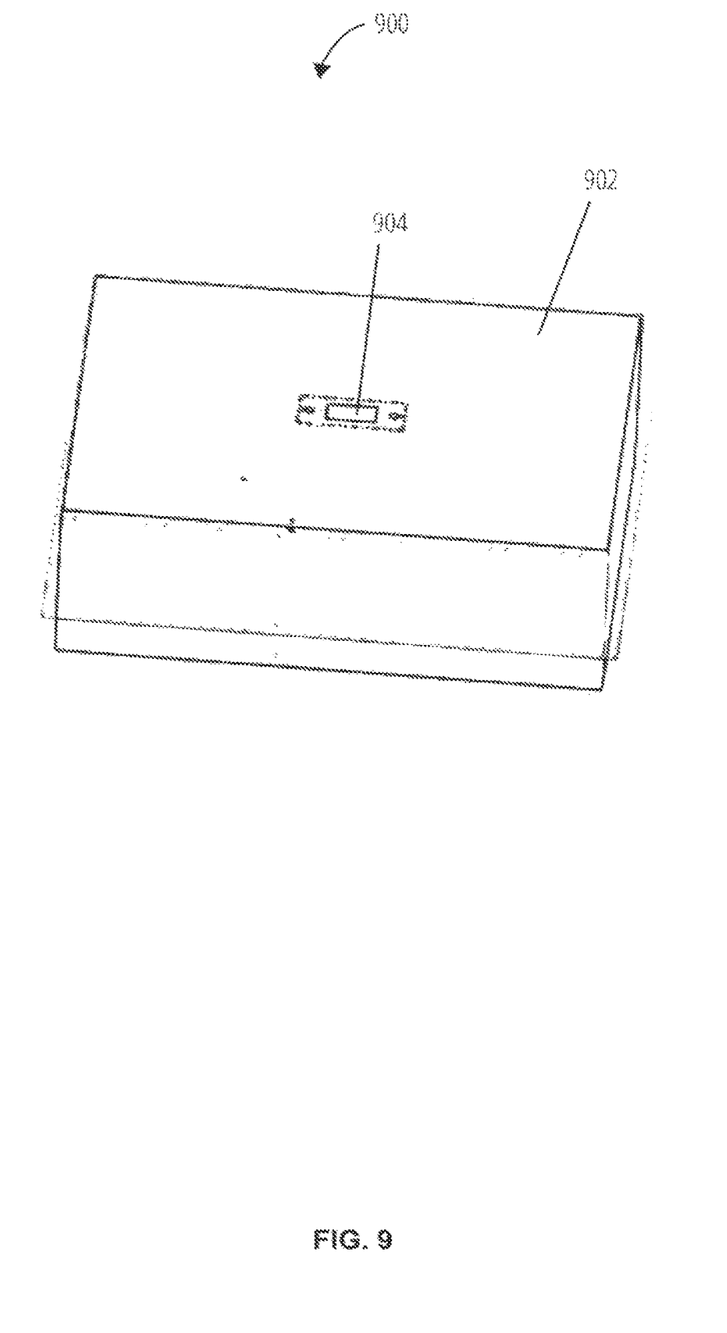
FIG. 9 illustrates a component in accordance with one or more embodiments.

FIG. 8 illustrates an exemplary circuit 800 for implementing the above-mentioned kill switch feature. The circuit 800, once on by the actuation of a switch at the input 806 switch on, can cut off the propellers that are responsible left and right movement of the drone 100, varying the current output of the motor circuit 802. Once on, the circuit 800 can further reduce the velocity of the propellers responsible for lift so the drone 100 can lower itself to the ground. Lastly, the circuit 800 can switch on an LED light that will flash a light signal at the output 804 so that a user can locate the drone 100. FIG. 9 shows a remote device 900 that can be used to implement the kill switch features. The remote device 900 can include a housing 902 through which there is an opening to provide access to a button 904. Once the button is pressed, the kill switch feature is engaged and an interrupt signal can be transmitted to the drone 100 to instruct it to land as described above with respect to the circuit 800.

Figure 10:
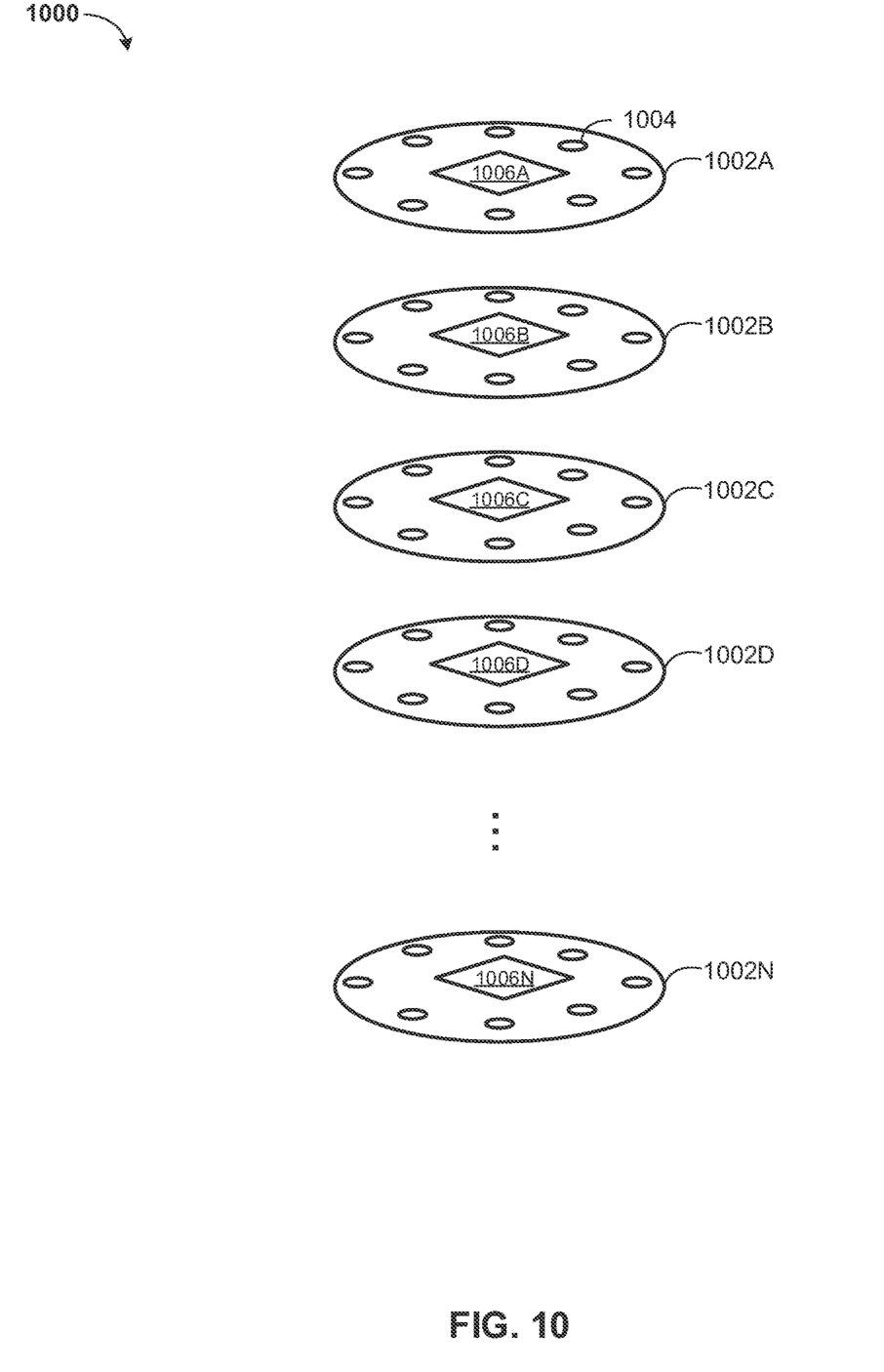
FIG. 10 illustrates an configuration of a processor and one or more electronic components in accordance with one or more embodiments.

FIG. 10 illustrates an exemplary configuration 1000 for a processor 1006A and one or more electronic components 1000B-1000N. The electronic components 1000B-1000N may include, among other things, an inertial sensor, a power supply, a LiDAR receiver, a servomotor controller, an electronic speed controller, and a battery charge regulator. Each of the processor 1006A and the electronic components 1000B-1000N may be coupled to one or more printed circuit boards 1002A-1002N that may be arranged in a vertical stack orientation with respect to one another. It may be appreciated that this configuration may reduce space requirements and improve weight distribution and corresponding flight characteristics. The printed circuit boards 1006A-1006N may include one or more electrical contacts 1004 to allow electrical connections to the processor 1006A and the electronic components 1006B-1006N. The electrical contacts 1004 may include, for example, one or more pads to allow outside devices (e.g., motors and sensors) to be coupled to the processor 1006A and the electronic components 1006B-1006N. The electrical contacts 1004 may also include, for example, vias that may allow the processor 1006A and the electronic components 1006B-1006N to be coupled to one another. It may be appreciated FIG. 10 provides a non-limiting example of a printed circuit board configuration and that there may be any number of printed circuit boards and 1002A-1002N and electronic components 1006B-1006N arranged in any order. It may also be appreciated that while FIG. 10 depicts only one electronic device coupled to each printed circuit board, any number of electronic devices may be coupled to each printed circuit board as space allows.

Figure 11:
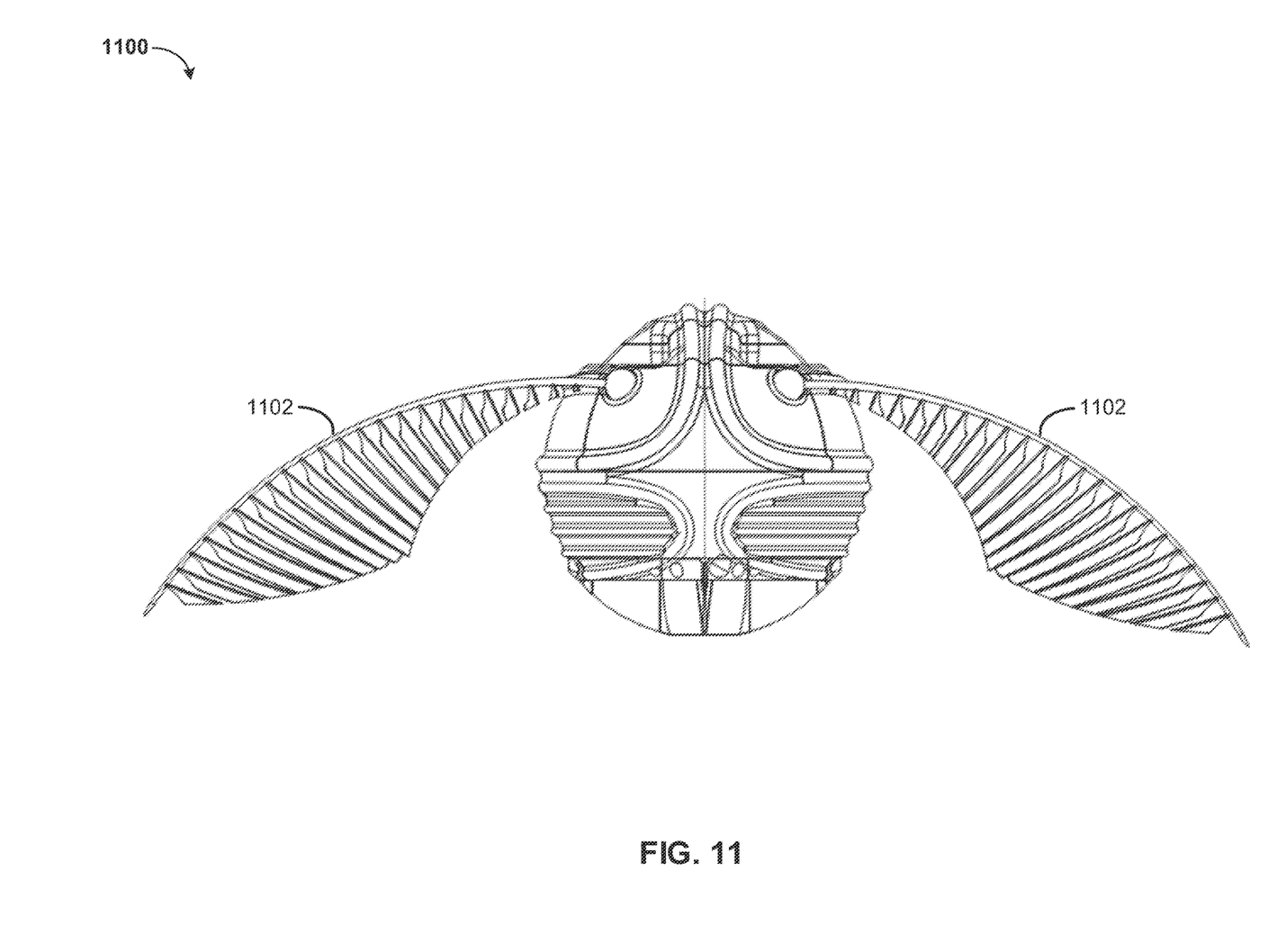
FIG. 11 illustrates a drone in accordance with one or more embodiments.

FIG. 11 illustrates an exemplary drone housing 1100 according to one or more embodiments. The drone housing 1100 may, for example, be made of plastic, metal, wood, or any other material or combination of materials. The drone housing 1100 may be spherical or substantially spherical in shape. The drone housing 1100 may include one or more openings for airflow and one or more flight control surfaces that may be controlled by one or more servomotors. One or more wings 1102 may be coupled to the drone housing 1100. It may be appreciated that the wings 1102 may or may not actively contribute to the flight of the aerial device.

Generally, embodiments may include a drone (e.g., an aerial device) that includes a processor and a memory. The memory may include instructions that, when executed by the processor, cause the processor to perform operations. The operations may include receiving a first signal indicative of a first position of the drone and generating, based on the first signal and based on a randomly or pseudo-randomly generated sequence, a second signal configured to actuate motion hardware of the drone to a second position. When the drone is an aerial device, the second signal is thus configured to actuate flight hardware (e.g., motors and propellers) to move the aerial device to the second position. When the drone is a land-based device, the second signal can engage wheels, chains, motors, to cause the drone to move to the second position.

The operations may further include generating, based on a third signal indicative of the second position and on another randomly or pseudo-randomly generated sequence, a fourth signal configured to actuate the drone's motion hardware to move the drone from the second position to a third position. In other words, the drone can move to another position randomly. When the-aforementioned set of operations is performed by the processor continuously, the result is effectively a drone that moves randomly or pseudo-randomly and continually, though the random or pseudo-random motion can be constrained within a predetermined perimeter or within a predetermined volume.

The drone may include a position sensor, such as one that would be provided by an on-board global positioning module or by on-board inertial sensors, such as an accelerometer. The processor may be configured to receive the first signal from such a position sensor. Furthermore, the processor may be configured to receive an interrupt signal that causes the drone to enter into a shutdown sequence. A shutdown sequence can be construed herein as a set of operations effectuated by the processor to cause the drone to cease its functioning and be retrieved by a user.

For example, for an aerial device, the shutdown sequence can include causing the device to decrease its altitude (i.e., to lower its z-component) until it lands and to turn off its propellers. Subsequently, the shutdown sequence can further include turning on a beacon to allow a user to retrieve the drone. Such a beacon can be either a strobing set of light of emitting diodes, or a repeating RF burst, or a combination thereof. The interrupt signal may be received wirelessly by the drone. Such a capability can be provided by an on-board transceiver module that is communicatively coupled to the processor. The interrupt signal may also be generated by detecting tactile input from a user, such as when a user captures the drone, based on data from the inertial sensors and/or accelerometer.

In some embodiments, the random or pseudo-random path may be constrained within a predetermined geographical region. Specifically, though the drone can move randomly, the drone's motion can be made to stay within a certain perimeter and/or below a certain altitude. Such constraints can be placed on the drone's motion by instructing the processor to discard any coordinate(s) included in generated random or pseudo-random path that put(s) the drone outside of the constrained region. This ensures that the drone remains within the desired region, while being able to move randomly or pseudo-randomly within that region.

The drone may further include an obstacle detection sensor. The obstacle detection sensor can be either an on-board radar system or a LIDAR system or the like. Upon detecting an obstacle, the drone may initiate the generation of a random or pseudo-random path from its current position in order to avoid the obstacle. As such, when the drone moves about the randomly or pseudo-randomly generated path in response to detecting an obstacle, the drone takes an evasive action and maneuvers away from the obstacle.

In some embodiments, the drone may include a shell or a housing that is configured to house the processor, the memory, and motion hardware, such as propellers and motors in the case of an aerial drone. Furthermore, in the case of an aerial drone, in some embodiments, the device may include retractable wings. Although the wings can be retracted towards the drone's body or extended away from the drone's body, the wings do not actively participate in causing the drone's flight. As such, the wings may be ornamental in nature. This feature may be appealing to a user when the drone is a toy.

In general, the operations of the processor may include receiving a first signal indicative of a position of the drone and planning a random or pseudo-random path along which the drone will subsequently travel autonomously to a second position. For example, when the drone is an aerial device, the processor may generate a second signal configured to cause the aerial device to move along a random or pseudo-random flight path to the second position. The random or pseudo-random flight path can be thought of as a set of randomly or pseudo-randomly generated x, y, and z triplets of coordinates.

Those skilled in the relevant art(s) will appreciate that various adaptations and modifications of the embodiments described above can be configured without departing from the scope and spirit of the disclosure. Therefore, it is to be understood that, within the scope of the appended claims, the teachings set forth in the present disclosure may be practiced other than as specifically described herein.

What is claimed is:

1. An aerial device for a recreational application, the aerial device comprising:
   a housing;
   a processor located within the housing;
   flight hardware, comprising:
      a single motor located within the housing coupled to the processor; and
      a single propeller coupled to the motor;
   a memory including instructions that, when executed by the processor, cause the processor to perform operations comprising:
      receiving a first signal indicative of a first position of the aerial device; and
      generating, based on the first signal and based on a randomly or pseudo-randomly generated sequence, a second signal configured to actuate flight hardware of the aerial device to a second position,
   wherein the generating comprises:
      randomly or pseudo-randomly sampling a first x coordinate value of a first coordinate triplet, randomly or pseudo-randomly sampling a first y coordinate value of the first coordinate triplet, and randomly or pseudo-randomly sampling a first z coordinate value of the first coordinate triplet,
      determining that the first x coordinate value is outside of a predetermined geographical region, that the first y coordinate value is inside the predetermined geographical region and the first z coordinate value is inside the predetermined geographical region,
      discarding the first x coordinate value,
      generating a second x coordinate value, and
      determining the second x coordinate value is inside the predetermined geographical region, and
   wherein the second position is indicated by the second x coordinate value, the first y coordinate value and the first z coordinate value.

2. The aerial device of claim 1, further comprising one or more sensors coupled to the processor.

3. The aerial device of claim 2, wherein the sensors comprise one or more of a position sensor, an obstacle detection sensor, an accelerometer, and an inertial sensor.

4. The aerial device of claim 2, wherein the instructions further comprise shutdown instructions based on receiving an input from the one or more sensors.

5. The aerial device of claim 1, further comprising a navigation system.

6. The aerial device of claim 5 wherein the navigation system comprises at least one of a GPS receiver, a radar receiver, and a LiDAR receiver.

7. The aerial device of claim 5, wherein the instructions further comprise instructions to move the aerial device to the second position based on data received from the navigation system.

8. The aerial device of claim 1, wherein the flight hardware further comprises one or more servomotors configured to manipulate one or more flight control surfaces on the housing.

9. The aerial device of claim 8, wherein the flight control surfaces comprise one or more of a rudder, an elevator, an aileron, a flap, a slat, a spoiler, and a tab.

10. The aerial device of claim 1, wherein the aerial device comprises a set of wings that do not actively contribute to flight.

11. The aerial device of claim 1, wherein each of the processor, an inertial sensor, a power supply, a LiDAR receiver, and a servomotor controller are coupled to one or more printed circuit boards arranged in a vertical manner.

12. The aerial device of claim 1, further comprising a battery coupled to the processor and the motor.

13. The aerial device of claim 12, further comprising a battery charge regulator coupled to the battery.

14. The aerial device of claim 13, wherein the battery charge regulator is coupled to the housing, and wherein the housing and battery charge regulator are configured to couple to an insert that is configured to couple to an external battery charger.

15. The aerial device of claim 1, wherein the operations further comprise:
  while the aerial device is on a flight path to the second position, detecting an obstacle, in response to detecting the obstacle:
    i) randomly or pseudo-randomly sampling a third x coordinate value of a second coordinate triplet, randomly or pseudo-randomly sampling a second y coordinate value of the second coordinate triplet, and randomly or pseudo-randomly sampling a second z coordinate value of the second coordinate triplet,
    ii) confirming that a third flight path towards the second coordinate triplet is away from the obstacle, and
    iii) generating a third signal to actuate the flight hardware toward a third position, wherein the third position is the second coordinate triplet.

16. The aerial device of claim 1, wherein the housing is substantially spherical in shape.

17. The aerial device of claim 1, wherein the operations further comprise:
  receiving a kill switch signal,
  in response to the kill switch signal, lowering an altitude of the aerial device to land, and
  turning on a light emitting diode or transmitting an RF burst signal configured to allow a user to locate the aerial device.

* * * * *